United States Patent [19]

Kamerling et al.

[11] 4,073,855
[45] Feb. 14, 1978

[54] MIRROR ASSEMBLY METHOD

[75] Inventors: Marc A. Kamerling; Jeffrey L. Franks; Harold R. Wilson, all of Holland, Mich.

[73] Assignee: Donnelly Mirrors, Inc., Holland, Mich.

[21] Appl. No.: 448,275

[22] Filed: Mar. 5, 1974

[51] Int. Cl.² .................. B29C 27/30; B29D 3/00
[52] U.S. Cl. .................. 264/249; 264/296; 264/297; 264/322; 264/323; 425/508; 425/509
[58] Field of Search ............ 264/249, 323, 296, 322, 264/DIG. 66, 69, 23, 327, 295, 339, 297; 425/508, 509, 384, 391, 392, 393

[56] References Cited

U.S. PATENT DOCUMENTS

| | | | |
|---|---|---|---|
| 1,884,131 | 10/1932 | Neidich | 264/322 |
| 2,431,238 | 11/1947 | Friedman | 264/249 |
| 2,535,517 | 12/1950 | Rhodes | 264/249 |
| 2,544,622 | 3/1951 | Ulmer et al. | 264/69 |
| 2,554,327 | 5/1951 | Gravley | 264/69 |
| 2,633,758 | 4/1953 | Hobson et al. | 264/249 X |
| 2,724,884 | 11/1955 | Jones | 264/249 |
| 2,740,202 | 4/1956 | Fowle | 264/23 |
| 2,960,777 | 11/1960 | Doll | 264/23 |
| 2,989,785 | 6/1961 | Stahl | 264/249 |
| 3,183,291 | 5/1965 | Miller et al. | 264/322 |
| 3,399,018 | 8/1968 | Leblanc | 264/249 |
| 3,676,543 | 7/1972 | Gerber et al. | 264/322 |
| 3,754,310 | 8/1973 | Shea | 264/249 |
| 3,918,799 | 11/1975 | Kurz, Jr. et al. | 350/288 |

FOREIGN PATENT DOCUMENTS 221,899   9/1924   United Kingdom ........... 264/322

Primary Examiner—Jan H. Silbaugh
Attorney, Agent, or Firm—Price, Heneveld, Huizenga & Cooper

[57] ABSTRACT

A method for forming mirror assemblies, especially rearview mirror assemblies for vehicles, wherein a thermoplastic mirror case is held inverted with its side wall portions extending downwardly. The side wall portions are softened by immersion in a heated bath and are pressed into a forming die which supports a reflective mirror element to form an arcuate mirror element retaining lip about the peripheral edges of the mirror element. Apparatus for performing the method includes an indexing table which sequentially moves the cases and mirror elements loaded thereon to one position, removes the cases from the table, combines them with the mirror elements via the forming die, and returns the completed assemblies to the table.

16 Claims, 22 Drawing Figures

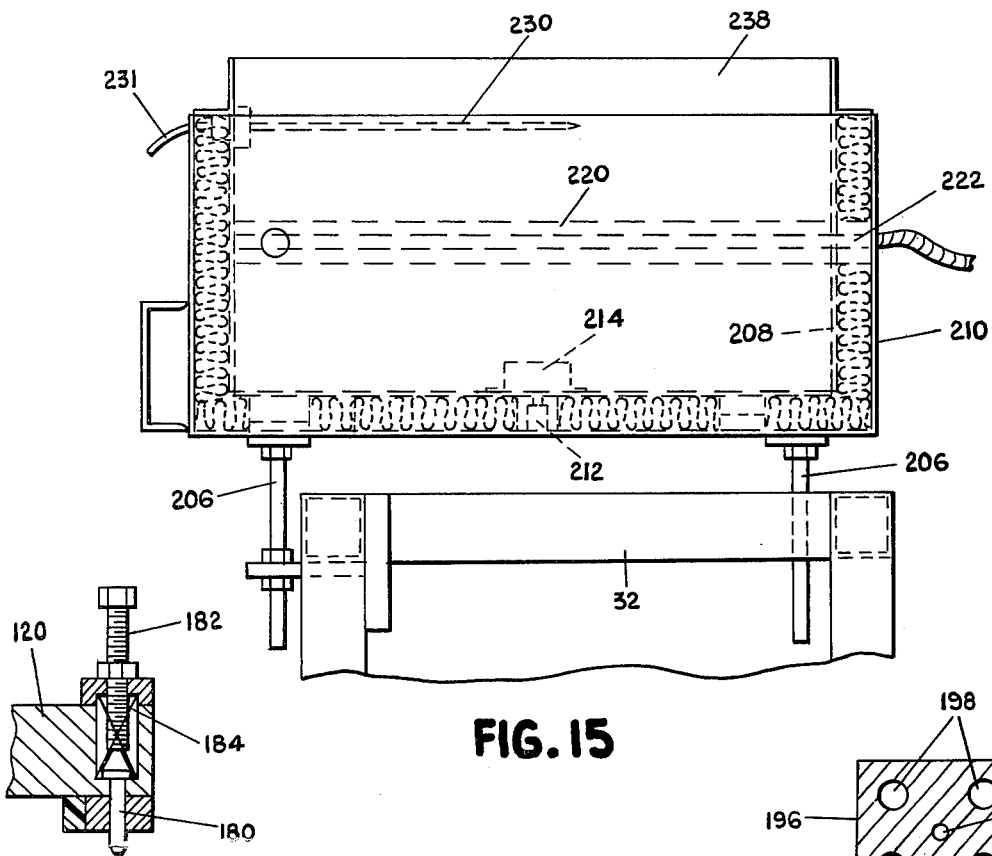
FIG. 15
FIG. 11
FIG. 12
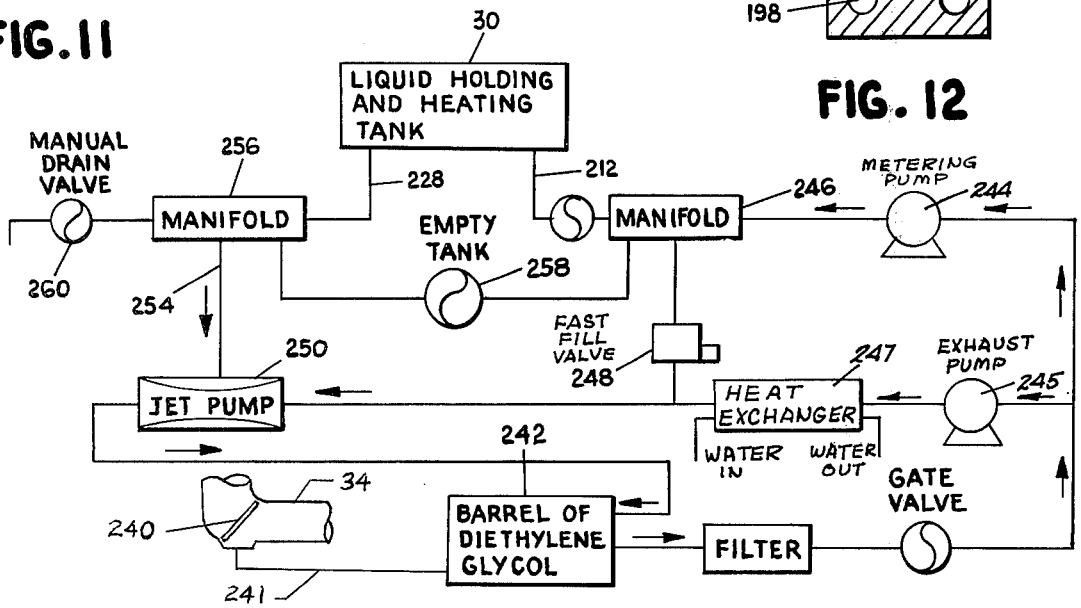
FIG. 17
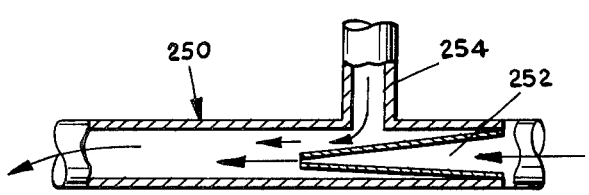
FIG. 17A

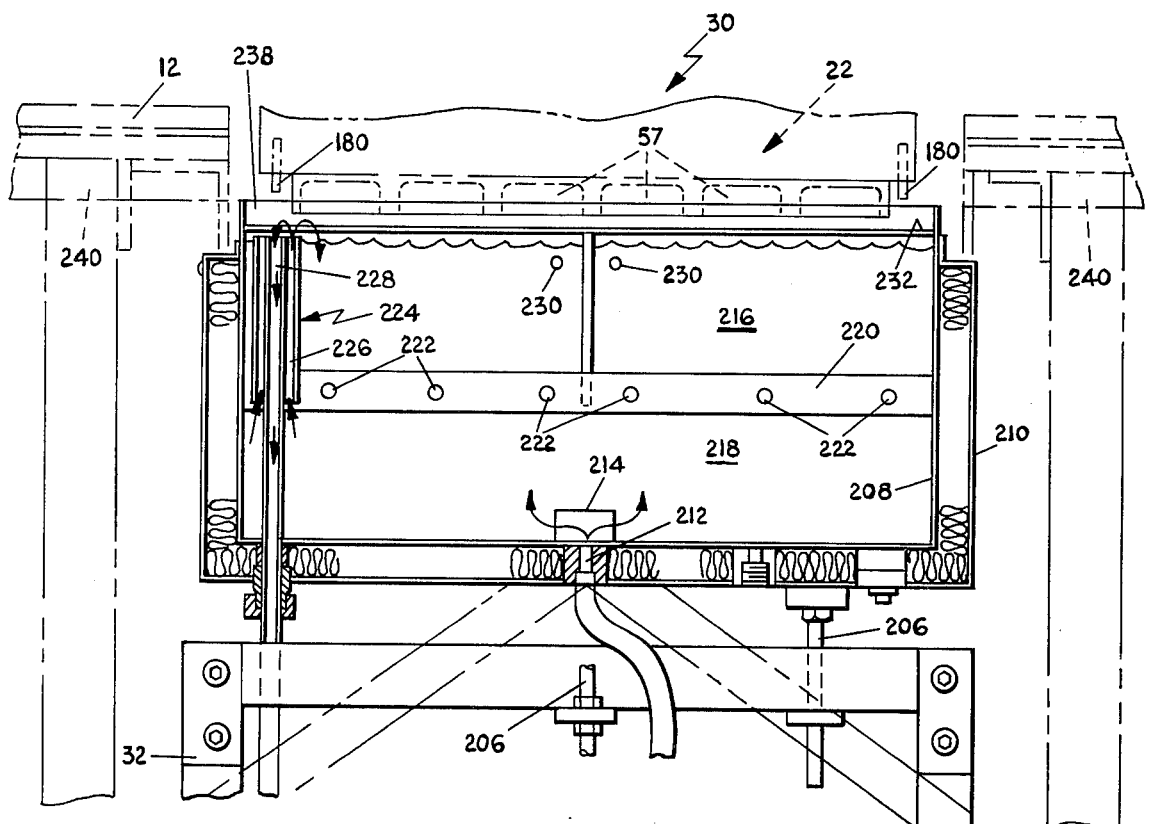

FIG.14

MIRROR ASSEMBLY METHOD

| GRASP AND HOLD INVERTED A THERMO PLASTIC MIRROR CASE WITH SIDE WALL PORTIONS EXTENDING DOWNWARDLY. | → | IMMERSE PORTION OF SAID CASE INCLUDING SAID SIDE WALL PORTIONS IN A HEATED LIQUID FOR A PREDETEMINED PERIOD OF TIME. |
|---|---|---|
| PRESS SAID HEATED PORTIONS OF SAID CASE INTO A FORMING DIE, HAVING A REFLECTIVE MIRROR ELEMENT THEREON TO FORM SAID PORTIONS INTO A MIRROR ELEMENT RETAINING LIP. | → | COOL SAID HEATED FORMED MIRROR ELEMENT RETAINING PORTIONS TO RETAIN THEM IN CONTACT WITH SAID MIRROR ELEMENT. |

FIG.19

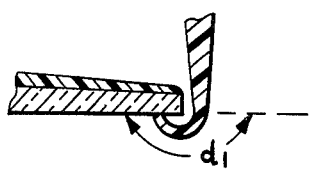

FIG.19A

MIRROR ASSEMBLY METHOD

This invention relates to a method for assembling mirrors and mirror cases and, more particularly, to a method especially adapted to assemble rearview mirrors for vehicles by forming a rolled, arcuate edge which allows internal expansion of the reflective mirror element without separation from the mirror case.

BACKGROUND OF THE INVENTION

Continued development of mirrors and mirror assemblies especially designed for use in vehicles has recently given rise to assemblies in which lightweight mirror cases house reflective mirror elements. Such lightweight assemblies greatly reduce the effects of image blurring vibration transmitted thereto when mounted in a vehicle. One such mirror assembly is disclosed in U.S. patent invented by Arthur W. Kurz, Jr. and Harold R. Wilson and entitled MIRROR CASE AND, and assigned to the same assignee as the present invention. That rearview mirror includes a hollow case formed from a thermoplastic material with a reflective mirror element mounted therein. A thin, projecting side wall or edge of the case, extending about the entire periphery of the mirror elements therein is curled into an arcuate, peripheral, retaining edge. That edge defines a space extending between the entire periphery of the mirror and the case and allows the mirror and case to expand or contract in extreme temperatures without expelling or breaking the mirror element.

Production of mirror assemblies of the type as discussed above, wherein portions of one part must be heated and formed consistently and efficiently on a high volume basis, is the principal purpose of the present apparatus and method. We have discovered that for such high volume production, the projecting edge of the thermoplastic case must be heated precisely to a temperature within the transition temperature range of the material from which the case is formed. The transition temperature range is that in which the material softens, undergoes large changes in mechanical strength, and undergoes large changes in viscosity. Such physical transition is analogous to the changes which occur in glass which are defined by glass transition or transformation temperatures. The case including the heated portions must be transferred quickly and smoothly such that the heated portions may be formed around the edge of the reflective mirror element before the heated material cools sufficiently below the transition temperature range and regains its memory. All of these steps must be taken with the case and mirror elements being held in exact alignment and must be nearly exactly reproduceable in order to maintain consistently high quality mirror assemblies. Moreover, these steps must be repeated at a sufficiently high rate of speed to produce a high volume of mirror assemblies.

SUMMARY OF THE INVENTION

Accordingly, it is an object and purpose of the present invention to provide a method for forming portions of a thermoplastic mirror case in order to retain a reflective mirror element within the case to produce a completed mirror assembly. More particularly, it is the purpose of the present invention to provide a method for efficiently and consistently producing a mirror assembly of the type disclosed in U.S. Pat. No. 3,918,799 mentioned above including the production of an arcuate edge about the periphery of a reflective mirror element to form a case which allows the expansion and contraction of the mirror element within the case.

A related purpose of the present invention is to provide such a method by utilizing a heated liquid to precisely and accurately heat predetermined portions of thermoplastic elements, and especially thermoplastic mirror cases for vehicular mirrors, which heated thermoplastic elements are thereafter combined with reflective mirror elements to form completed mirror assemblies. Further purposes of the invention are to provide a method for simultaneously assembling several mirror assemblies by positioning, locating, and combining various of the parts of each assembly accurately and consistently at a relatively high rate of speed.

In the preferred embodiment, the present method comprises grasping and holding in an inverted manner a preformed, thermoplastic mirror case having a back portion and side wall portions projecting therefrom. The mirror case, including the side wall portions, is at least partially immersed in a heated liquid for a predetermined period of time. Thereafter, the heated portions of the case are pressed into a forming die to form those portions about the periphery of the mirror element and into a mirror element retaining lip. The retaining lip is then cooled to retain it in contact with the mirror element completing the assembly.

The above method is preferably accomplished using an indexing means, such as an indexed conveyor, for moving the various elements of the mirror assembly from a loading position to and through a plurality of stations, the indexing means including a plurality of tools located at specified positions thereon for receiving and locating the various assembly parts. Means are provided at one of the stations for assembling the various parts. The assembling means includes means for removing at least one of the mirror assembly parts from the indexing means, means for assembling the one removed part with the remainder of the elements utilizing the tools on the indexing means which are brought into alignment with the assembly means at one of the stations, and means for returning the completed assembly to the indexing means for transportation to an unloading station.

More specifically, the indexing means comprises a rotary table. A reciprocating case nest or ram is located at one station about the indexing table. Thermoplastic mirror cases and reflective mirror elements are sequentially loaded on the indexing table and brought into registry with the reciprocating nest. The cases are picked up by the nest, dipped into a heated liquid retained in a fluid tank aligned with the nest, and immediately thereafter combined with the reflective mirror element via forming dies which are also brought into registry with the reciprocating nest. After assembly of the cases and mirror elements, the completed assemblies are returned to the table.

These and other objects, advantages, purposes, and features of the invention will become more apparent from a study of the following description taken in conjunction with the drawings.

BRIEF DESCRIPTION OF THE DRAWINGS

FIG. 8A is a bottom view of the mirror case grasping and holding means;

FIG. 11 is a fragmentary, sectional view of one of the spring-biased locating pins included on the corners of the case nest shown in FIGS. 7-10;

FIG. 12 is a sectional view of the high pressure hydraulic cylinder forming a portion of the means for reciprocating the case nest;

FIG. 14 is a sectional, side view of the liquid tank and supporting stand in relation to the indexing means and case nest;

FIG. 15 is a fragmentary, end elevation of the fluid tank shown in FIGS. 13 and 14;

FIG. 17 is a schematic illustration of the liquid supply system associated with the liquid tank shown in FIGS. 13-15;

FIG. 17A is a sectional side view of the Venturi device used in the fluid system shown in FIG. 17;

FIG. 19 is a flow diagram of the basic mirror assembly method; and

FIG. 19A is a fragmentary, sectional view of one of the mirror assemblies showing the formed mirror case lip.

DESCRIPTION OF THE PREFERRED EMBODIMENT

Indexing and Assembly Apparatus Generally

Figure 1:
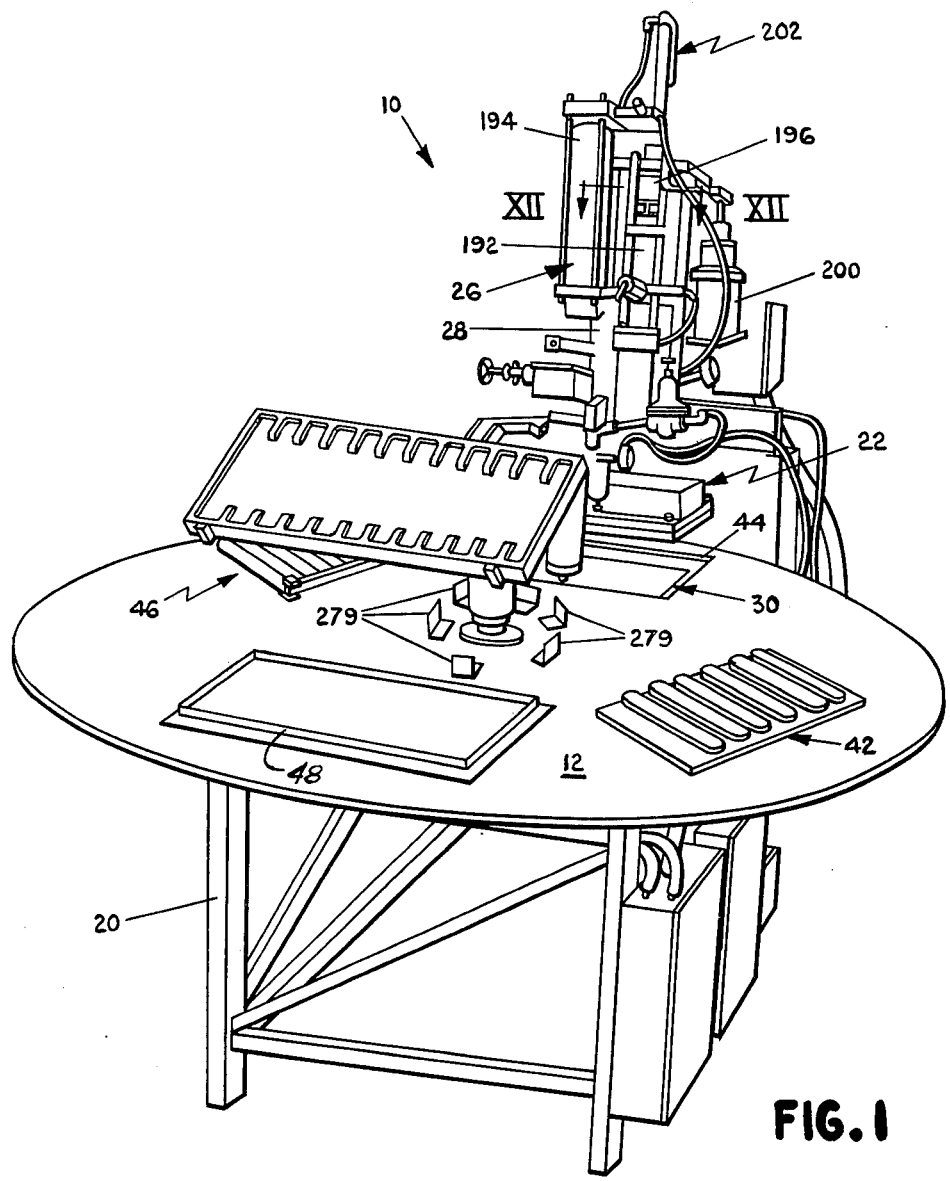
FIG. 1 is a perspective view of the present invention comprising the indexing and assembling apparatus for mirror assemblies.
Figure 2:
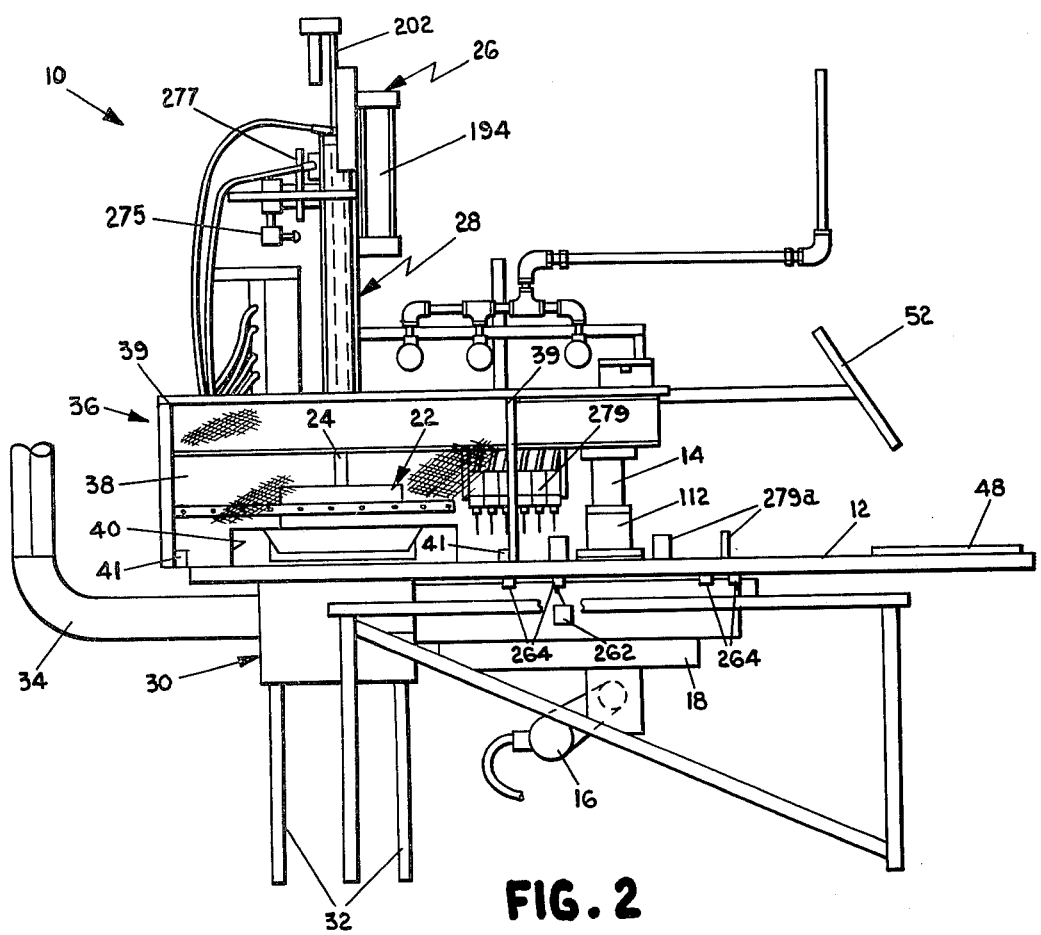
FIG. 2 is a side elevation of the indexing and assembly apparatus shown in FIG. 1.

Referring to the drawings in greater detail, and particularly FIGS. 1 and 2, the indexing and assembly apparatus 10 includes a circular indexing table conveyor 12 which is rotatable clockwise about a vertical shaft 14 by a pneumatic motor 16 via a conventionally known Geneva drive 18. The rotary table is supported on a suitable framework 20 including legs and cross braces. At one position over the table 12, adjacent the periphery thereof, is mounted a mirror case receiving nest 22 in the form of a ram head. The case nest 22 is reciprocated on an elongated vertical shaft 24 by a series of cooperating fluid cylinders 26, all of which are mounted on suitable framework 28. A liquid holding and heating tank 30 is mounted below the indexing table 12 in alignment with the case nest or ram 22 on a support 32 independent of the table 12 and framework 20. A conduit 34 (FIG. 2) for exhausting vapors from the heated liquid in the heating tank 30 is provided at the rear of the apparatus.

The area surrounding the case nest or ram 22 is provided with suitable guards and safety screens 36. At least one of the guard panels 38 (FIG. 2) is pivotable upwardly about points 39 to provide maintenance access to the ram area. Suitable cut-out portions 40 are provided in the lower portion of panel 38 to allow the various tools and parts of the mirror assemblies to pass therethrough to the area beneath ram 22. Limit switches 41 contact pivotable screen 38 and are connected to the electrical circuit to prevent operation of the machine when the screen is pivoted out of contact therewith.

Figure 3:
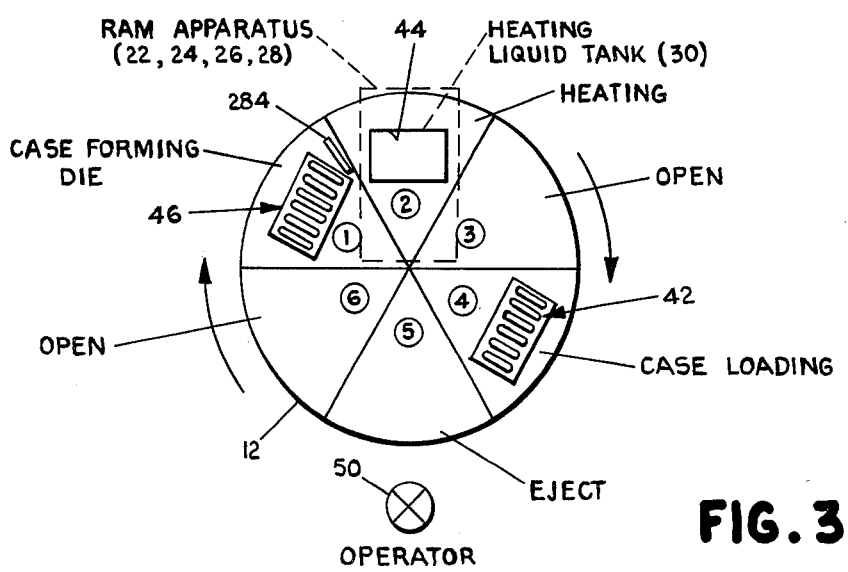
FIG. 3 is a schematic plan view of the indexing table shown in FIGS. 1 and 2.

Referring to FIG. 3 in addition to FIGS. 1 and 2, the rotary indexing table 12 supports various tools in several of six equal sectors into which the rotary table is divided. As will be more fully described hereinafter in connection with the operation of the apparatus, control means including limit switches 262, 275, and 279 both on the reciprocating apparatus for the case nest or ram 22 and on the drive means for the rotating indexing table 12 are provided for both automatically and manually sequencing the indexing table for successive movement through each of the six sectors of the circle. Although not all of the sectors are utilized in the preferred embodiment, several tools and a tank registry aperture are provided in certain of the sectors (see FIG. 3). A mirror case locating die 42 is positioned in sector 4, a rectangular aperture 44 in sector 6, and a reflective mirror element locating means and case edge forming die 46 in sector 1. Each of the tools and apertures 42-44 is positioned such that it will be in registry with the liquid holding and heating tank 30 and/or the case nest or ram 22 upon rotation of the indexing table 12. A pan 48 for receiving completed mirror assemblies from the case nest 22 is provided in sector 3.

Loading of the indexing table is accomplished from an operator position 50 diametrically opposite the ram apparatus such that the various mirror assembly parts may be loaded on the case locator 42 and forming die 46 as they are rotated past position 50. A support 52 for holding a plurality of packed reflective mirror elements ready for loading is supported in cantilevered fashion in a position where they can be reached for loading by an operator at the operator position 50.

Mirror Case Locating Die

Figure 4:
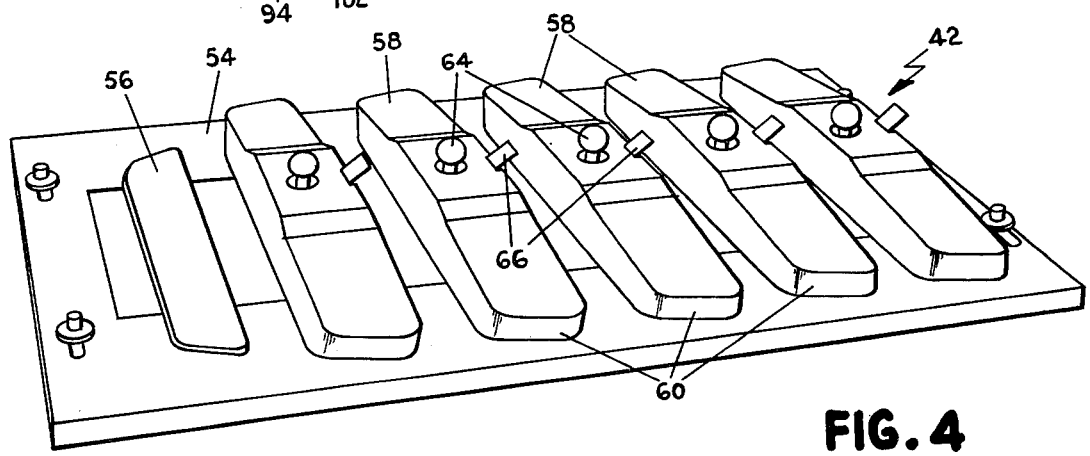
FIG. 4 is a perspective view of a partially loaded mirror case locating apparatus which is carried on the indexing apparatus.

As shown in FIG. 4, the mirror case locating die 42 secured in sector 4 of the indexing table 12 includes a plate 54 including a series of six raised embossments 56. Each embossment 56 is in the shape of the opening of one of the thermoplastic mirror cases 57 used in the mirror assembly forming process. These embossments are constructed to each receive a case as disclosed in FIGS. 4 and 16 and more specifically disclosed in previously mentioned, U.S. Pat. No. 3,918,799, the disclosure of which is incorporated by reference herein. Each case includes a back portion 58 with a day/night actuator 62 including a ball pivot support 64 and pivot tab 66 pivotally secured thereto and a continuous side wall portion 60 extending generally perpendicularly outwardly from the back portion. Each case provides a hollow opening 67 for receiving a prismatic or other reflective mirror element 68 (FIG. 16) between and within the side wall portion 60 and support walls 69 within the case for supporting element 68 away from the back 58.

The raised embossments 56 on locating die 42 are of the same shape as the mirror element and are spaced apart along plate 54 such that each of the cases 57 can rest in an inverted manner with the ball support 64 projecting upwardly and the continuous side wall portion 60 extending downwardly in contact with plate 54. The cases are thus positioned to be picked up by the reciprocating case nest 22 when the case locator 42 is brought into registry with the nest. The plate 54 is secured via suitable slotted apertures and securing means 55 to the surface of table 12 so that it may be accurately positioned for registry with the case nest.

Reflective Mirror Element Locating and Forming Die Apparatus

Figure 5:
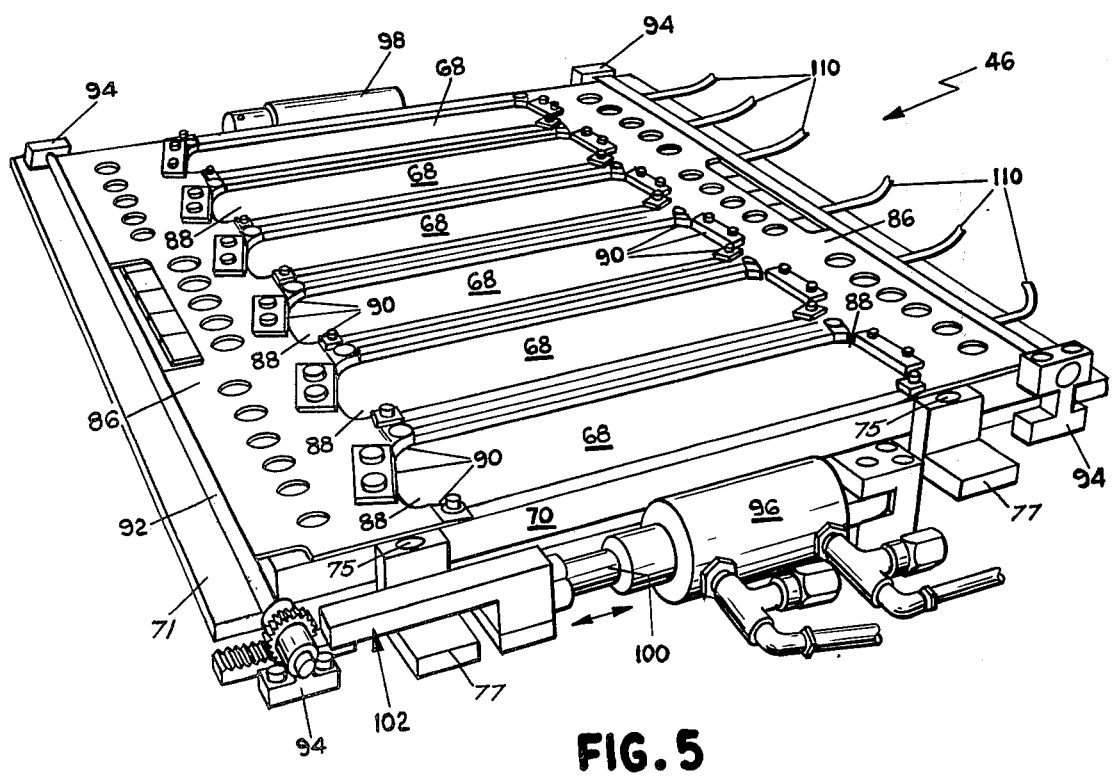
FIG. 5 is a perspective view of the reflective mirror element locating and mirror case forming die apparatus showing the mirror element locating guides in closed position.
Figure 6:
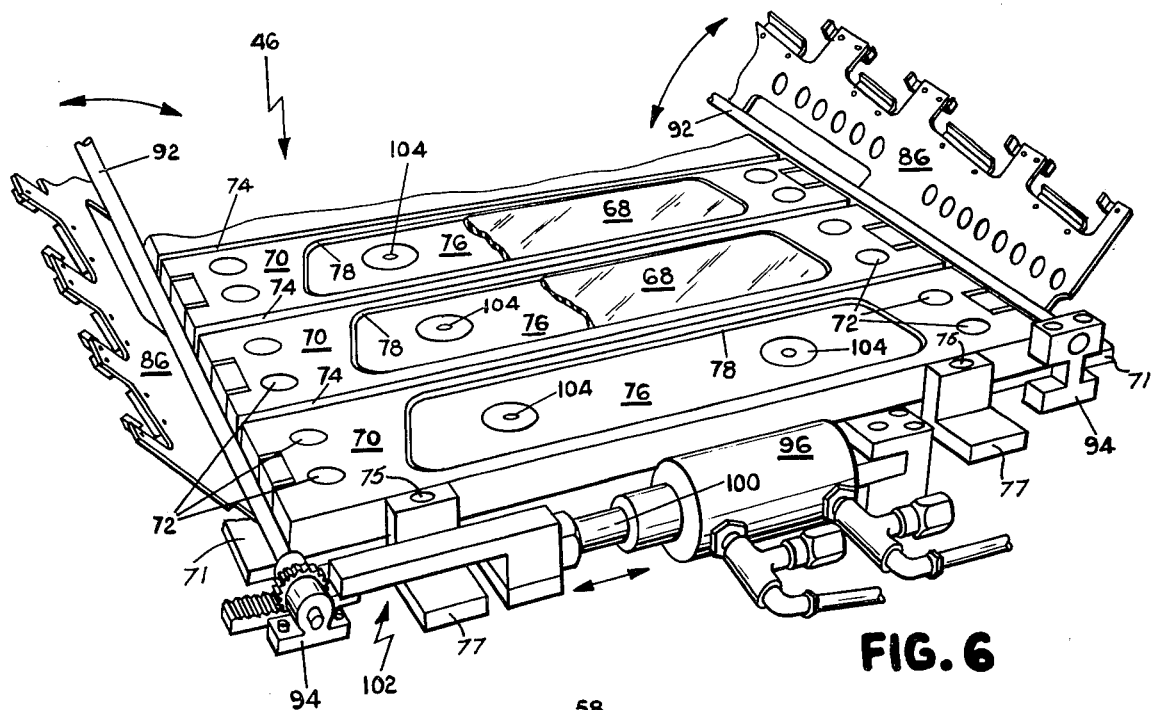
FIG. 6 is a fragmentary, perspective view of the apparatus in FIG. 5 with the mirror element locating guides in open position.
Figure 16:
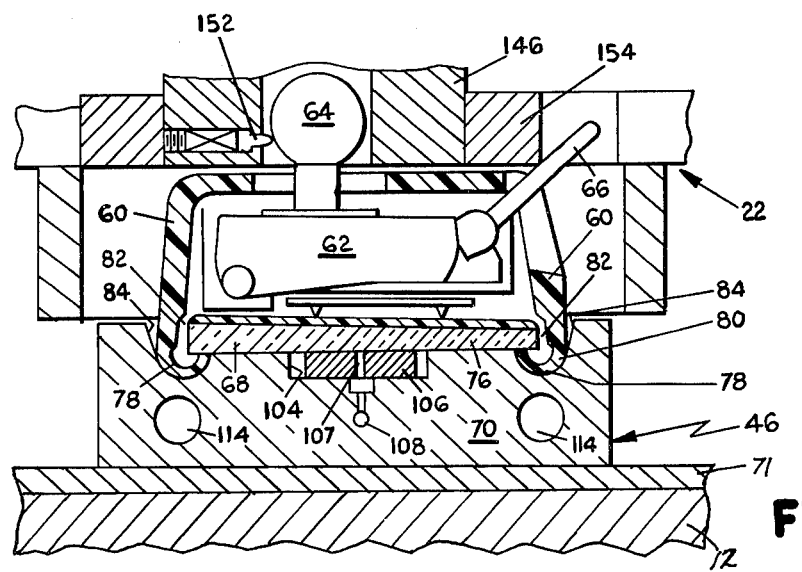
FIG. 16 is a sectional, end view of one of the mirror cases being formed in the mirror element locating means and forming die.

Referring to FIGS. 5, 6, and 16, the reflective mirror element locating and forming die apparatus 46 is shown including a series of six elongated forming die blocks 70. Blocks 70 are secured by suitable securing means 72 on a subplate 71 on table 12 and spaced from one another by slots 74 therebetween. Four tapered holes 75 are provided, one in each of four L-shaped brackets 77 which help secure block 70 and base 71. Holes 75 locate nest 22 with pins 180 on the nest when it is lowered over the blocks. Each block 70 includes a central planar surface 76 for receiving the front planar surface of a reflective mirror element 68 (FIGS. 6 and 16). A continuous, semicircular mirror case edge or lip-forming groove 78 extends around the complete periphery of surface 76 and is shaped to correspond to the outline of the side wall portion 60 of each case 67. As best seen in FIG. 16, the forming groove 78 extends beneath the peripheral edges of the mirror element 68 when that element is positioned on surface 76. Thus, when the mirror cases 57 are pressed into the forming dies after the side wall portions 60 have been heated in the heated liquid in tank 30, the ends of the side wall portions will be rolled into a semicircular mirror-retaining lip 80 which contacts perpendicularly the front surface of mirror element 68 and leaves an expansion area 82 around the entire periphery of the mirror element. The outer edge 84 of the groove 78 is sloped away from the mirror element 68 in order to direct the heated side wall portions as the case 57 is pressed into the forming die.

Exact positioning of the reflective mirror elements 68 on the planar surfaces 76 of the forming die blocks 70 is accomplished with guide plates 86 pivotally mounted adjacent the ends of the forming die blocks 70. Each of the plates 86 includes six curved recesses 88 corresponding to the shape of the ends of the mirror elements 68 and a series of three die blocks 90 at three places around each of the curved recesses. When plates 86 are closed, dies 90 extend downwardly into the grooves 78 and contact the peripheral edges of the ends of the mirror element 68 to exactly position the elements over groove 78 on planar surfaces 76.

Each of the guide plates 86 is secured to a pivot rod 92, which rods 92 are in turn pivotally mounted in pivot blocks 94 adjacent the four corners of the group of forming die blocks 70. Rods 92 are pivoted by pneumatic fluid cylinders 96 and 98 which are connected by shafts 100 to rack and pinion mechanisms 102. Actuation of the pneumatic cylinders 96 and 98 thereby reciprocates the rack included in apparatus 102 and pivots the guides between their closed positions (FIG. 5) and their open positions (FIG. 6). The guide plates 86 are closed prior to the loading of mirror elements 68 on forming die blocks 70 by the operator thereby automatically positioning the mirror elements as they are loaded. Immediately prior to rotation of the forming die apparatus 46 beneath the case nest 22, the plates are pivoted to their open position by cylinders 96 and 98, thereby leaving the mirror elements exactly and accurately positioned for combination with the heated thermoplastic mirror cases held by case nest.

Once located, mirror elements 68 are held in the aligned, located position by vacuum hold-down devices 104. As best seen in FIG. 16, the vacuum hold-down devices include compressible pads 106 forming suction-like cups of a rubber-like material having a central opening 107 therein for conducting a negative pressure from a vacuum conduit 108 extending through the blocks. Each of the vacuum conduits 108 is connected to a vacuum source by a flexible tube 110 (FIG. 5). The vacuum source includes a venturi 278 (FIG. 18) through which is directed compressed air via a line leading from rotating air pressure coupling 112 mounted around vertical shaft 14 on the indexing apparatus 10.

Each of the forming die blocks 70 also includes circular passageways 114 extending longitudinally therethrough for conducting cooling fluid such as water for cooling the blocks 70 and hence the surfaces of grooves 78 after the heated side wall portions 60 have been rolled into their arcuate form 80 in the grooves. Suitable connecting tubes attached to blocks 70 may be used to conduct fluid through conduits 114 via fluid coupling 112 on shaft 14. In the preferred embodiment, however, conduits 114 are plugged since the normal sequencing time period between pressing operations with the indexing table is sufficient to allow the grooves 78 to cool to a desired temperature.

Mirror Case Receiving Nest and Reciprocating Apparatus

Referring to FIGS. 7–11, the mirror case receiving nest or ram 22 includes mechanisms for grasping and holding six parallel, elongated thermoplastic mirror cases, means for lowering and suddenly raising or jerking the cases with respect to the nest and means for ejecting the completed assembly following the combination of the cases with the reflective mirror elements.

Figure 9:
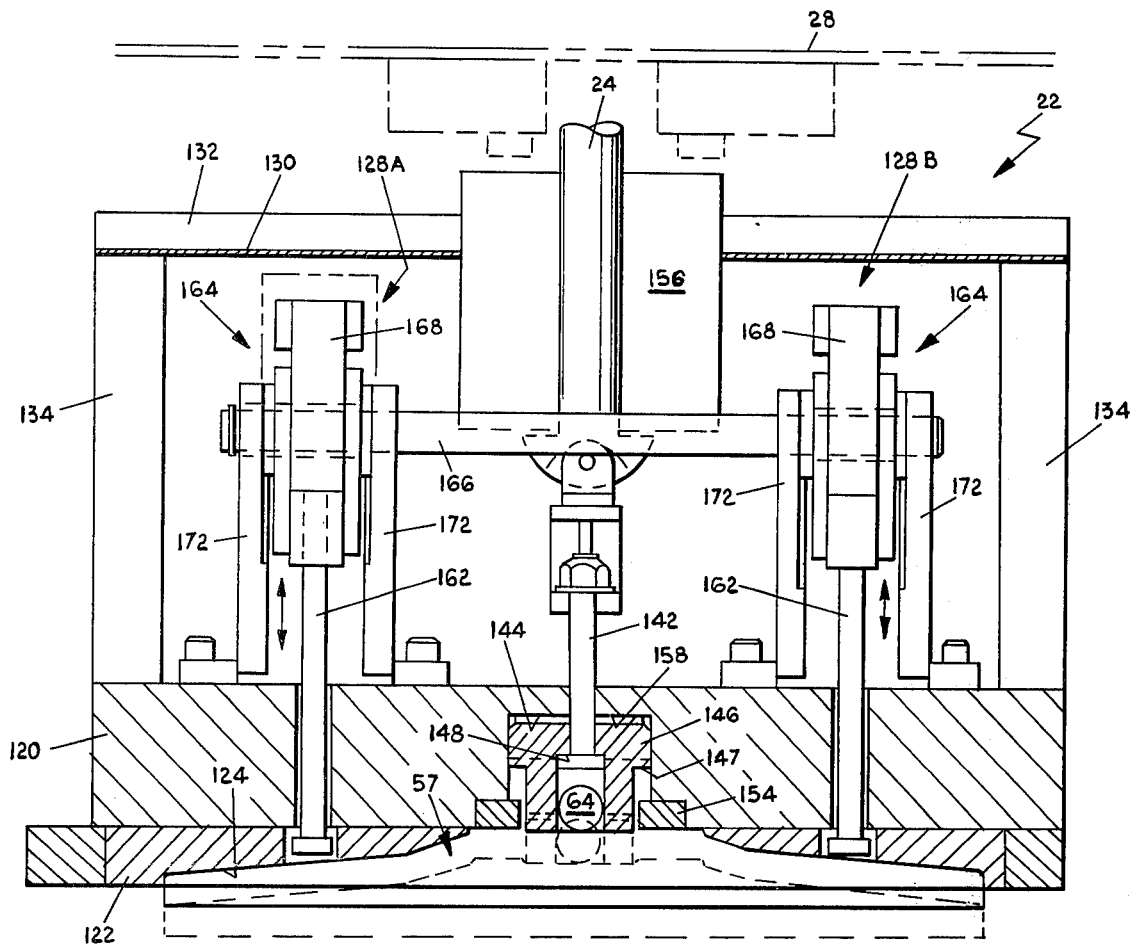
FIG. 9 is a sectional, end view of the case nest taken along plane IX—IX of FIG. 7.
Figure 13:
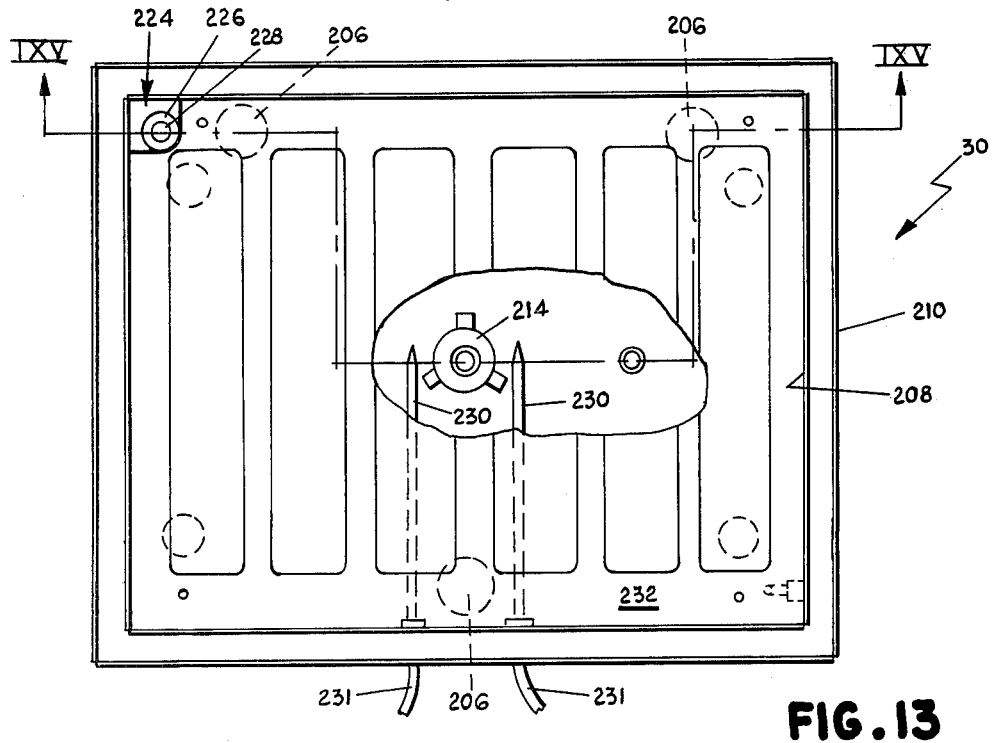
FIG. 13 is a plan view of the liquid holding and heating tank located in alignment with the case nest.

The case nest 22 comprises a rectangular support plate 120 beneath which is secured a case-receiving pocket member 122 molded from a plastic material and including six parallel pockets 124 each having a longitudinal cross-sectional shape corresponding to the shape of the back of one of the thermoplastic mirror cases (see FIG. 9). Molded pockets 124 hold each of the cases 57 level to ensure a proper attitude for dipping the side wall portions 60 thereof in tank 30. Mounted atop the support plate 120 are two separate mechanisms including a case raising and lowering mechanism 126 and a case ejecting mechanism 128 including portions 128a and 128b. The raising and lowering mechanism 126 is mounted centrally on the nest 22 between the two portions 128a and 128b of the eject mechanism. A sheet metal housing 130 covers the raising and lowering and eject mechanisms atop the support plate 129 while a bracing plate 132 extends between upright members 134 on either edge of the nest 22. The vertical reciprocating shaft 24 from the reciprocating means is secured below brace plate 132 by a clamping block 136 such that the entire case may be lifted by the reciprocating means. A portion of the fluid cylinder supporting framework 28 provides a stop for limiting the upward movement of the nest 22.

Figure 7:
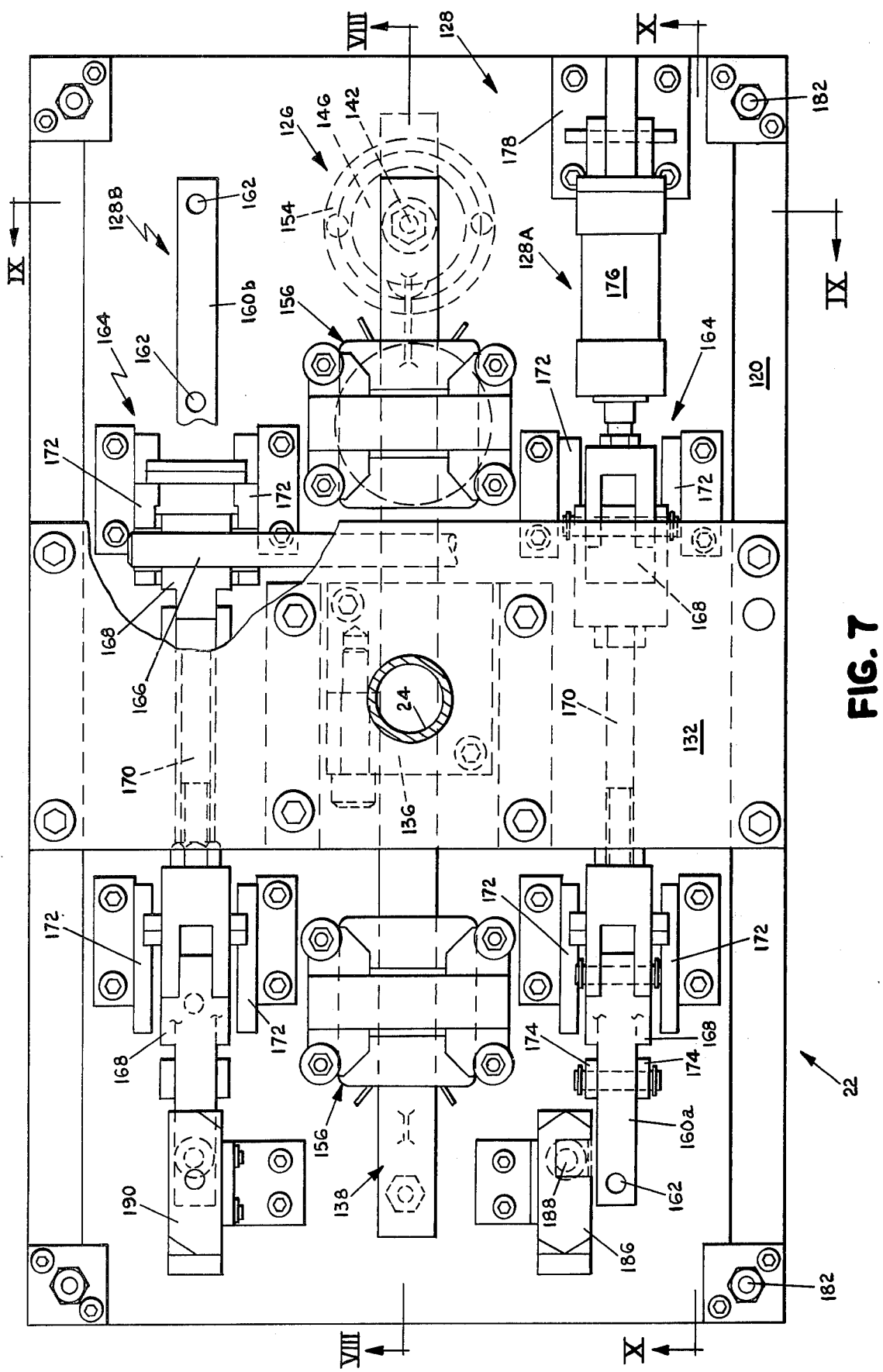
FIG. 7 is a plan view of the reciprocating mirror case retaining and fluid removal nest with substantially all of its cover broken away.
Figure 8:
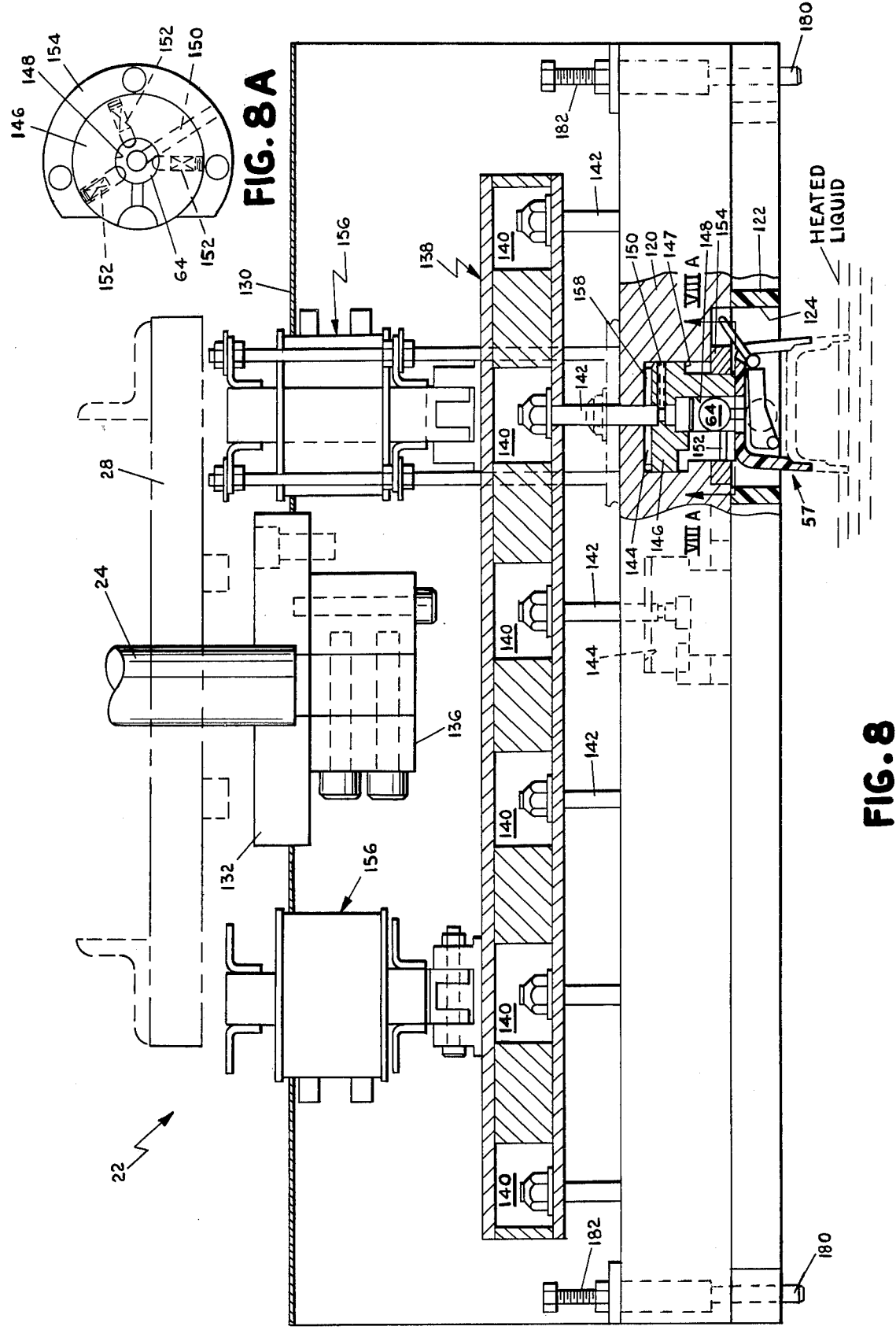
FIG. 8 is a sectional, side view of the case nest taken along plane VIII—VIII of FIG. 7.

As is best seen in FIGS. 7 and 8, the case raising and lowering mechanism 128 includes an elongated rigid member 138 extending nearly the entire length of the case nest 22 and including spaces 140 from which rods 142 extend. Rods 142 extend downwardly through support plate 120 into cylindrical apertures 144 spaced above each of the case-receiving pockets 124. Mirror case grasping and holding cylinders 146 are fitted in each of the correspondingly sized apertures 144. Each of the cylinders 146 includes a central, cylindrical aperture 148 extending thereinto for receiving and holding a ball pivot support 64 of one of the mirror cases 57 (see FIGS. 8 and 16). The end of the rod 142 is received through aperture 148 and secured in cylinder 146 by a set screw or other similar means 150.

As is best seen in FIG. 8A, a series of three spring-biased pins 152 are spaced equally about the periphery of aperture 148 so as to extend into the aperture a slight distance. When the case nest is lowered over the several located cases 57 on case locator 42 which has been brought into registry with the case nest, the spring-biased pins 152 are first forced radially outwardly by ball pivots 64 and are then biased under the circumference of the ball pivot after it has been forced into the aperture. The mirror case is best held rigidly against the bottom surface of the cylinder 146 and in pockets 124 by these grasping means.

Once the six mirror cases 57 have been grasped and retained by pins 152 in cylinders 146, they are retained as shown in the solid lines in FIG. 8. In order to lower the six cases below the bottom of the case nest 22 a distance sufficient to allow them to be dipped into the heated liquid when the case nest itself is lowered, two electrically operated solenoids 156 are mounted over and connected to the support member 138. Upon actuation, solenoids 156, which are biased upwardly to normally retain the six cases within the pockets 124, simultaneously lower member 138 and thus the six rods 142 and case-grasping cylinders 146, to lower the six cases to the position indicated in phantom in FIG. 8. Downward travel of the cylinders 146 is limited by collar 154 and shoulder 147 on each of the cylinders. Upward travel of the cylinders is limited by the spacing pad 158 between the end of aperture 144 and the top of the cylinder 146.

After immersion in and slow withdrawal from the liquid in tank 30, solenoids 156 are actuated to suddenly lift or jerk the six cases 57 upwardly to shake off any residual liquid remaining on side wall portions 60. This snapping action seats the heated cases in pockets 124 and readies the cases for the pressing operation.

Figure 10:
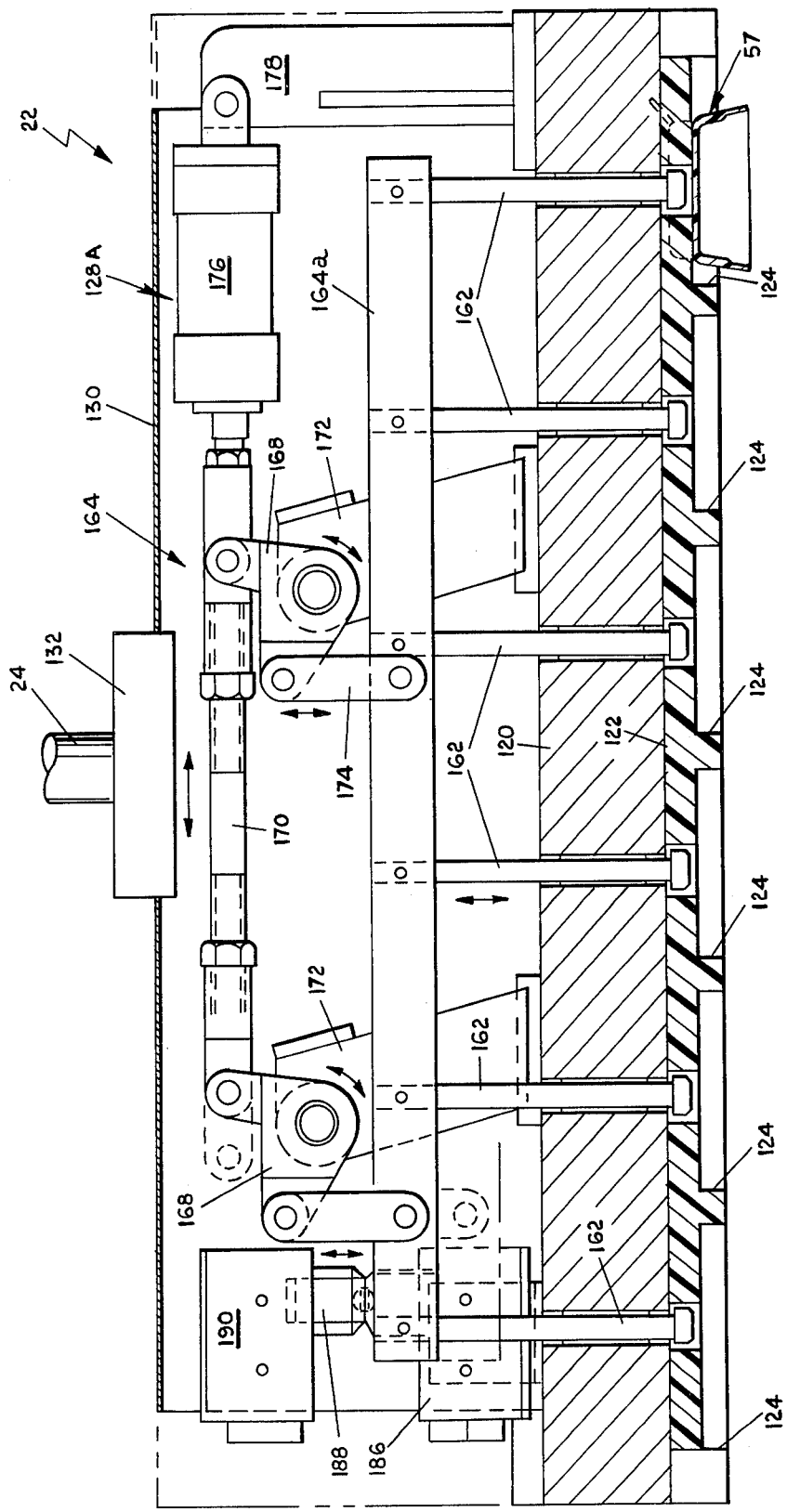
FIG. 10 is a sectional side view of another portion of the case next taken along plane X—X of FIG. 7.

Following immersion of the side wall portions of mirror cases 57 in the heated liquid, and following the pressing operation in which those heated portions are rolled into the arcuate lip 80 as shown in FIG. 16, the assembled mirror cases are released from the case nest by the ejection mechanism 128. As seen in FIGS. 7, 9, and 10, the eject mechanism includes two parallel bars 160a and 160b (FIG. 7) having six equally spaced eject rods 162 projecting downwardly therefrom into the case-receiving pockets 124 through support plates 120 and pocket member 122. Rods 162 include enlarged lower ends formed from or covered with rubber or other similar compressible material to prevent marring of the back of the cases 57. Rods 162 projecting from each of the two bars 160a and 160b therefore provide two eject rods in each of the case-receiving pockets 124, one rod adjacent either end of each pocket (see FIG. 9). Actuating linkages 164 connected by a cross rod 166 are provided over each of the bars 160 for reciprocating the twelve eject rods simultaneously to force the ball pivot support 64 on each case 57 past the pins 152 and out of the receiving apertures 148. Each of the linkages include a pair of L-shaped bell cranks 168 interconnected by a rod 170 and pivotally supported on supports 172 extending upwardly from support plate 120. The bell cranks 168 are in turn pivotally connected to the bars 160 by connecting links 174. Motive power for reciprocation of rods 170, and hence linkages 174, is provided by a pneumatic fluid cylinder 176 supported between one end of one of the rods 170 and an upstanding support member 178. Accordingly, upon actuation of cylinder 176, the interconnected linkages including bellcranks 168 rotate to reciprocate bars 160a and 160b and thus eject rods 162 downwardly simultaneously to force the six thermoplastic mirror cases from their receiving pockets after the assembly of the mirror part is completed.

A limit switch is provided adjacent one end of each of the bars 160. Limit switch 186 is mounted on support plate 120 adjacent the bar 160a and is actuated by a projecting member 188 extending from that bar. When member 188 contacts switch 186, indication is provided that the eject rods are fully extended and the assembled mirrors have been released from the case nest. Limit switch 190 is mounted over bar 160b and is contacted when the eject rods are fully withdrawn within the case nest to indicate the nest is ready to receive six more mirror cases.

As shown in FIGS. 7, 8, and 11, each of the four corners of the case nest includes a spring-biased locating pin 180. A threaded rod or bolt 182 is mounted above each of the locating pins to provide an upper limit for their movement against the force of the spring 184. As will be more fully explained below, the four locating pins 180 ensure proper alignment with the forming die 46 when case nest 22 is lowered for forming the heated side wall portions 60 of the mirror cases. Pins 180 also limit the downward travel of nest 22 to govern the amount of lip actually rolled.

Figure 18:
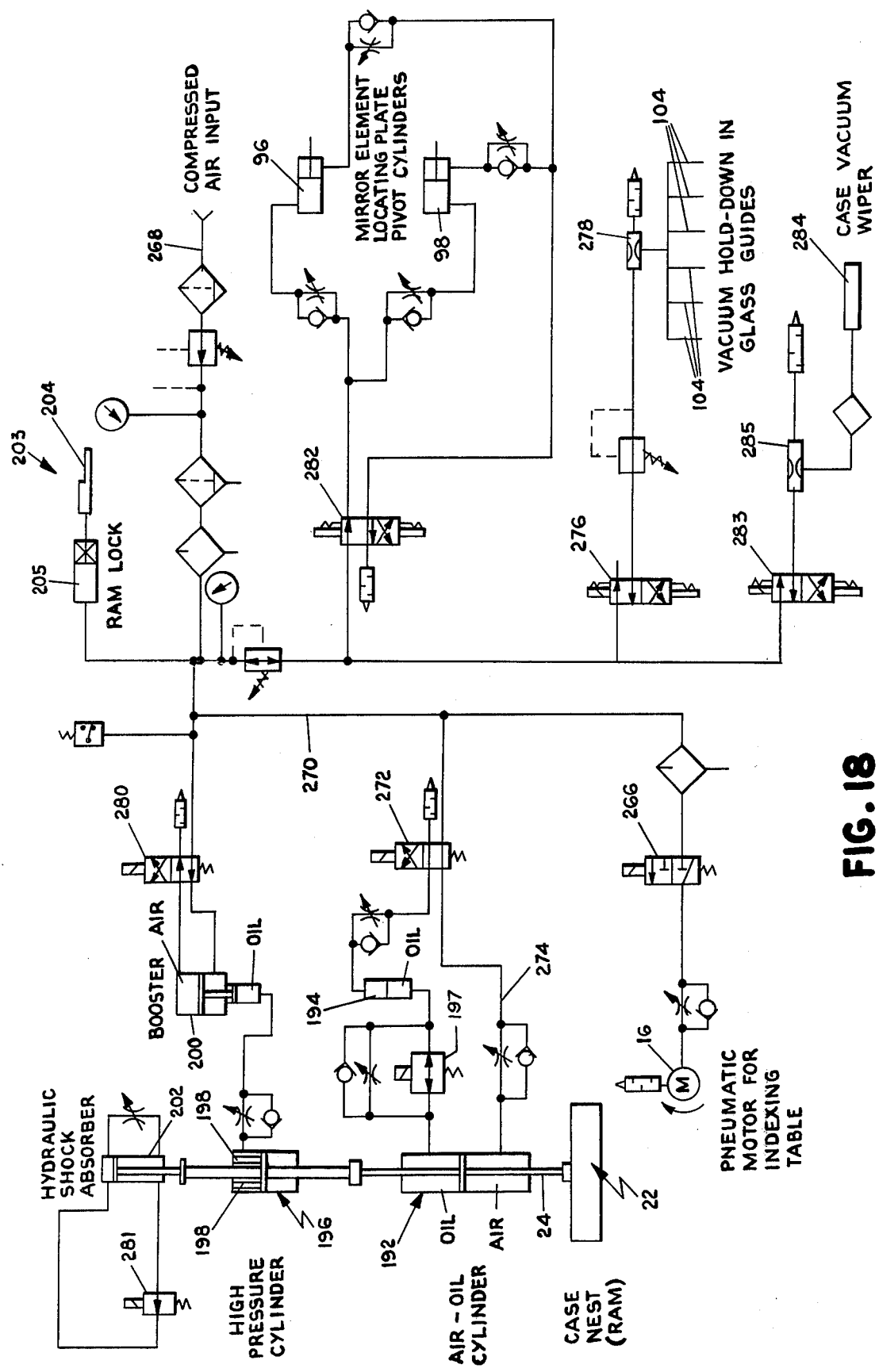
FIG. 18 is a schematic illustration of the pneumatic-hydraulic control system for the indexing and assembling apparatus.

Referring now to FIGS. 1, 2, 12 and 18, a series of fluid cylinders 26 is provided for reciprocating a case nest for performance of the assembly method as the various tools and mirror parts are brought into registry with the case nest on indexing table 12. A conventionally known air/oil cylinder 192 is provided for extension and retraction of the shaft 24 and hence case nest 22. As seen in FIG. 18, oil from an oil reservoir 194 is forced into the upper portion of cylinder 192 through appropriate valving and fluid regulating apparatus to downwardly extend the case nest 22. Compressed air is forced into the lower portion of the cylinder 192 to act on the opposite side of the pistons therein to retract the case nest upwardly.

For extension of the case nest during pressing of the heated lip portions wherein greater force and slower speed is required, a high pressure fluid cylinder 196 is provided vertically above cylinder 192 and acts on an extension of vertical shaft 24. As shown in FIG. 12, the high pressure cylinder 196 includes four small fluid pressure cylinders 198 spaced equally about the centrally located vertical shaft 24. Small extensions of the case nest with a great amount of force are accomplished by forcing oil from a booster fluid cylinder 200 to appropriate valving into the four small cylinders 198. The booster fluid cylinder, which is conventionally known and is commercially available from Jergens, Inc. of Cleveland, Ohio, multiples the compressed air pressure used to force the oil therefrom to provide a force approximately fifteen times as great as that which could be obtained using only the normal air pressure. In the preferred embodiment, the nest is extended by cylinder 196 at a rate of between approximately 2 and 2½ inches per second. The force applied is approximately 600–750 pounds over the entirety of the typical 12-inch long case. The force applied will be changed according to the size of the case, i.e., more force for larger cases. The four cylinders 198 provide a total pressure of approximately 5,400 pounds or 1350 pounds per square inch for each cylinder 198. Retraction of the case nest through the same small vertical distance is accomplished by closure of valve 197 for a short length of time (1–2 seconds) causing air pressure in the lower portion of cylinder 192 to force the piston in cylinder 192 upwardly.

Facilitating the slowing and the stopping of the shaft 24 and case nest 22 is an hydraulic shock absorber 202 mounted vertically above the high pressure cylinder 196 and acting on an extension of shaft 24. The hydraulic shock absorber 202 is a conventionally known unit known as a "Hydro-Check" which utilizes fluid pistons acting in fluid cylinders, which cylinders are interconnected by various conduits having solenoid-operated valves for controlling the flow therethrough for deceleration of a shaft acting on one of the fluid cylinders. Such conventionally known units are commercially available from Hypneumat Inc. of Milwaukee, Wis.

A reciprocating safety lock 203 (FIGS. 1 and 18) is included adjacent high pressure cylinder 196 for preventing undesired extension of shaft 24 and case nest 22. Lock 203 includes a notched bar 204 reciprocated into and out of engagement with a portion of cylinder 196 by a biased pneumatic fluid cylinder 205 such that the nest can be reciprocated when the notch and the said portion of the cylinder are aligned. The lock is biased to prevent reciprocation of the nest 22 unless cylinder 205 is actuated.

Accordingly, the case nest may be reciprocated through portions of the distance it travels via air/oil cylinder 192. It may also be extended slowly and with great force for the pressing operation by cylinder 196 thereby enabling greater accuracy, control, and consistency in the formation of the mirror-retaining edges on cases 57.

Liquid Holding and Heating Tank and Liquid Supply System

Referring now to FIGS. 13–15 and 17, the liquid holding and heating tank 30 is shown supported independently of the indexing table 12 by the supporting framework 32 on three adjustable, threaded support rods 206. The height of the tank 30 is adjustable independently of the table 12 while vibration from movement of the table is prevented from being transmitted to the tank. Tank 30 has a double-walled construction including an inner wall 208 and an outer wall 210 separated by an insulating space filled by fiberglass or similar insulating material. A filling aperture 212 is provided in the center of the bottom of the tank covered by a baffle 214 which forces the liquid into all portions of the lower part of the tank. The interior of the tank is divided into upper and lower portions 216 and 218, respectively, separated by a heater plate 220 forming a liquid-tight partition between the two portions. A plurality of six equally spaced, parallel heating elements are embedded within heating plate 220 and extend out through the side of the tank as shown in FIG. 15 such that they remain out of contact with the heated liquid. Fluid communication between the upper and lower portions 216 and 218 is provided by a coaxial conduit 224 in one corner of the tank. The conduit 224 extends through an aperture in heating partition 220 and includes an outer conduit 226 which conducts fluid from the preheat or lower heating portion 218 upwardly and into the upper portion 216. The inner conduit 228 serves as an exhaust or drain for excess fluid.

The height of the two concentric conduits 226 and 228 above the heating partition 220 is equivalent and defines the level of the heated fluid in the upper portion 216. If the level is up to the edge of the outer conduit 226, the heated fluid rising therein will flow inwardly and downwardly out through the drain conduit 228. However, if the level is below the edge of the conduit, it will flow outwardly into the upper portion 216. A pair of temperature sensors each including a thermocouple extend parallel to one another into the middle of the tank just beneath the surface of the desired level of the liquid for sensing the temperature thereof. The thermocouples 230 are connected via wires 231 to appropriate electrical circuitry which causes current flow through the resistive elements of heating elements 222 thereby imparting heat by conduction to the liquids in both upper and lower portions 216 and 218. One of the sensors 230 is wired to connect elements 222 in parallel to produce high heat (24 kilowatts) for initial start-up with totally cold liquid in tank 30. This sensor shuts off high heat just before the desired liquid temperature is reached. The remaining sensor maintains the temperature at a constant level by periodically actuating the elements 222 in the low heat stage (6 kilowatts) wherein those element are connected in series. It has been found that the present apparatus controls temperature variations across the entire top surface of the liquid in upper portion 216 within plus or minus 1° C.

The top surface of the liquid in the upper portion is covered with a baffle plate 232 (FIG. 13) including six parallel elongated rectangular apertures 234 spaced equally thereacross to allow the mirror cases to be dipped into the heated liquid therethrough when the case nest is lowered to the top of the tank 30. The inner wall 208 of the tank extends upwardly around the entire periphery of the tank to provide a flange 238 which retains the fluid therewithin. Polymethylpentene crystals may be spread on the liquid surface to reduce surface exposure thereby reducing evaporation and liquid loss and retaining heat in the liquid. These crystals are temporarily pushed aside by the cases during dipping.

Preferably, the liquid utilized in the tank for heating the extending side wall portions 60 of mirror cases 57 is diethylene glycol. This liquid has a boiling point of 472.6° F. (244.8° C.). Since the operational temperature required to heat the side walls of cases 57 (which are preferably formed from high impact polypropylene) is within the range of approximately 147°–153° C. and preferably 149° C., the operational temperature is well below the boiling point of the liquid. This temperature range and preferred temperature have been found to produce the best quality cases. The temperatures will vary according to the type of plastic used. Thus, loss of liquid through vaporization is minimized. However, in order to prevent the escape of any diethylene glycol which is vaporized in the tank, exhaust duct 34 (FIG. 1) is provided at the rear of the tank and connected to an exhaust fan. A screen 240 in duct 34 condenses the vapor and recirculates it to the liquid supply barrel 242 via line 241 (FIG. 17). Diethylene glycol has been found favorable for this application since it leaves little or no residue on the mirror cases after immersion therein, has a low toxicity, is not particularly dangerous, and is relatively inexpensive.

Referring to FIGS. 17 and 17A, diethylene glycol is supplied to the liquid tank 30 from a barrel 242 through a filter, gate valve and a metering pump 244. During normal operation of the tank, liquid is fed through metering pump 244 and manifold 246 at the normal, preferable rate of approximately 5 to 20, and preferably 6, cubic centimeters per second into filling line 212 in the bottom of tank 30. The maximum rate of feed is approximately 20-25 cubic centimeters per second. Should high speed filling be desired for the tank, the normally closed fast fill valve 248 may be opened and the metering pump closed. In this instance, the liquid is fed through exhaust pump 245 and heat exchanger 247. Exhaust pump 245 pumps at about 3 gallons per minute at about 30 pound per square inch. When valve 248 is closed, the capacity of the exhaust pump is fed through a venturi-like passageway, hydraulic ejector, or jet pump 250 and returned to the barrel 242.

Heat exchanger 247 removes heat and cools the liquid. Cooling water flows through the exchanger at about 2 gallons per minute. The exchanger maintains the temperature and viscosity of the liquid relatively constant even though the temperature and viscosity may change somewhat in barrel 242.

The venturi 250 includes a converging, cone-shaped restricted passage 252 connected to the fluid line from exhaust pump 245 and heat exchanger 247. The high speed passage of the fluid from these devices through passage 252 produces an accompanying vacuum or reduced pressure less than atmospheric pressure adjacent the conduit 254 thereby providing a suction or pressure differential in that conduit. Conduit 254 is connected to tank drain line 228 via a manifold 256. The atmospheric pressure acting on the fluid exiting from tank 30 in combination with the reduced pressure in conduit 254 constantly withdraws the excess fluid from the tank 30 at about 2 gallons per minute. This withdrawal is therefor independent of gravity. Should it be desired to empty the tank manually, manual valve 258 may be opened thereby emptying the tank but retaining the fluid in the closed system. Should it be desired to empty the tank without returning the fluid to the barrel 242, manual valve drain valve 260 may be utilized.

The venturi 250 provides several advantages in the fluid system. It first avoids gravity feeding of the fluids thereby preventing the plugging of the liquid lines. Secondly, since the diethylene glycol is used at approximately 148° C., which is above its flash point of 143.3° C., the mixing of the cold fluid from the exchanger 247 with the heated liquid within the ejector 250 cools the heated liquid as it passes therethrough to a temperature below the flash point. Finally, should the liquid be accidentally ignited, the venturi provides a point of restriction which prevents the liquid from flashing past that point thereby preventing ignition and explosion of the supply barrel 242. The venturi 250 is commercially available from the Penderthy-Houdaille Co. in Prophetstown, Ill.

SUMMARY OF OPERATION

Referring now primarily to FIGS. 1-3 and 18, the operation of the indexing and assembly apparatus 10 will now be understood. The operational sequence begins with the mirror case locating die (sector 4 in FIG. 3) adjacent operator position 50. The operator loads six thermoplastic mirror cases 57 on the raised embossments 56 as described above. Automatic sequencing electrical circuitry is actuated by pressing a button (not shown) and after a predetermined time preset on an electrical timing means included in the circuitry, the indexing table 12 is rotated by the pneumatic motor 16 until the case locating die 42 is in registry with the case nest 22 under the ram apparatus. Automatic sequencing of the indexing table is accomplished via conventionally known electrical circuitry including control relays, contacts actuated by the control relays, electrical solenoids operating pneumatic valves for operating the various tools and operating elements and electrical limit switches such as limit switch 262, located beneath table 12, and limit switches 275 and 279 above the table (FIG. 2). Limit switch 262 is contacted by projecting members 264, one member being located in each of the six sectors beneath the table 12. The apparatus 10 may also be manually actuated by using electrical circuitry including manual controls for each of the several operations.

With reference to FIG. 18, after the cases 57 have been loaded on case locating die 42, an electrical timer times out and actuates solenoid 266 allowing compressed air to be fed from input line 268 past appropriate fluid lubricators, filters, regulators, and gauges along lines 270 through solenoid-operated valve 266 to the pneumatic motor 16. The table rotates through the sectors 2 and 1 in FIG. 3 until it is in registry with the case nest 22. Limit switch 262 contacts a projection 264 actuating an electrical timer which holds the table in this position for a predetermined period of time.

At this point, the electrical circuitry actuates solenoid-operated fluid valve 272 to cause oil from reservoir 194 to be forced into air/oil cylinder 192 thereby extending case nest 22 into contact with the ball pivot supports 64 on cases 57. As explained above, the cases are grasped and held by the case nest. The electrical timer times out releasing the biased pneumatic valve 272 causing the case nest with the retained mirror cases therein to be reciprocated upwardly by the compressed air fed through lines 270 and 274.

While the cases are being picked up by the case nest, the operator at position 60 is simultaneously loading reflective mirror elements 68 in the mirror element locating and edge forming die 46 which is positioned adjacent the operator position 50 and opposite the position of the case locating die 42. The mirror element locating plates 86 are in their closed position during loading such that the mirror elements are automatically accurately positioned on the forming die in the manner described above. Also, solenoid valve 276 has been actuated via appropriate electrical circuitry (FIG. 16) causing compressed air to pass through a fluid regulator and venturi and muffler 278 thereby providing a negative pressure or vacuum to the vacuum hold-down apparatus 104 in each of the die-forming blocks 70.

Control over the Hydro-Check shock absorber 202, as well as the distance which case nest 22 is extended by cylinder 192, is provided by a series of electrical limit switches 275 contacting a series of variously positioned limit switch contacting rods 277 (FIG. 2) on the rear of the ram apparatus. Since the case nest 22 is extended different distances by cylinders 192 and 196 and slowed and stopped by the Hydro-Check shock absorber 202 at each different position of indexing table 12, at least two limit switches in the series 275 are provided for each position of the indexing table. Accordingly, thirteen reciprocating apparatus limit switches are provided on the ram apparatus including two limit switches for each of the six table positions and an additional limit switch indicating the ram is completely retracted.

An additional bank of limit switches 279 is provided over the indexing table for engagement with a series of contacting members 279a. A contacting member is included for each of the six sectors of the table, and all are spaced at different radial distances from the vertical shaft 14 of the table 12 such that they will contact a different one of the limit switches in bank 279. This series of limit switches actuates appropriate electrical circuitry for stopping movement of table 12 in the appropriate sector and for operating the sequence of operations in the location of the ram apparatus depending on which sector of the table is aligned under the case nest.

After the mirror cases have been picked up by case nest 22 and the mirror elements 68 have been loaded on forming die 46, an electrical timer times out and the indexing table is sequentially moved to bring rectangular aperture 44 into registry with both the case nest and the heating liquid tank 30. In this position, the electrical circuitry actuates solenoid valve 272 to extend the case nest to a position adjacent the top of heating tank 30. During such extension, the solenoids 156 are actuated to extend the retained mirror cases out of the bottom of the case nest to a position for dipping in the heated liquid. Thereafter, the solenoid valve 280 (FIG. 18) is actuated and timed to cause cylinder 196 to extend the nest such that the side wall portions 60 of cases 57 are immersed into the heated liquid. The case side walls remain immersed for a period of approximately fifteen to twenty-five seconds. The preferable immersion period is eighteen seconds. After immersion, solenoid valve 280 is released and solenoid valve 197 closed causing the cylinder 192 to retract the case nest slowly such that the side wall portions are slowly withdrawn from the heating liquid. Such slow withdrawal allows the beads of liquid remaining on the side walls to be drawn back into the liquid tank to minimize any residue on the mirror cases. After the slow withdrawal, solenoid 272 is released allowing case nest 22 to be fully retracted by cylinder 192. The electrical circuitry actuates solenoid valve 281 at appropriate times during the extension and retraction of the case nest in response to the limit switches in series 275 as mentioned above in order to stop the reciprocal movement via the Hydro-Check 202.

Immediately upon withdrawal of the heated cases from the heating liquid, the table 12 is indexed via the aforementioned circuitry and air motor 16 to bring the forming die 46 into registry with the heated cases. Prior to such indexing, however, the solenoid valve 282 is actuated to extend the pistons in fluid cylinders 96 and 98 thereby pivoting the guide plates 86 out of contact with mirror elements 68 which are left in exact position to be combined with the heated mirror cases. After the glass dies 86 have been pivoted out of the way, solenoid valve 283 is actuated to produce a vacuum in a felt-covered mirror case vacuum wiper block 284 (FIGS. 3 and 18) via a venturi 285. The wiper block 284 passes under the heated side wall portions during indexing of the table and draws off any residual fluid left on the edges of the mirror cases prior to their being crimped and formed in the forming dies 46.

Once the forming dies are in registry with the heated cases in case nest 22, solenoids 272 and 280 are again actuated to press the heated side wall portions into the grooves 78 to form the arcuate lip 80 on each of the mirror cases for retaining the mirror elements therein. The high pressure cylinder presses the heated cases into the forming die under a pressure of approximately 5,400 pounds or 600–750 pounds distributed over each 12-inch case under the influence of the booster 200 in the manner described above. Pins 180 fit into holes 75 in brackets 77 to accurately locate the nest over the forming dies.

During the time period in which the forming dies 46 are in registry with the case nest, the case locating dies 42 are adjacent the operator position 50. A new batch of cases 57 is loaded thereon and the cycle is then repeated. The electrical timing apparatus included in the electrical circuitry retains the formed mirror cases in the forming dies 46 for a predetermined period of time such that the arcuate lips will cool sufficiently to harden and regain their strength and rigidity in their arcuate shape and retain the mirror elements in the cases. Thereafter, solenoid valve 280 is released and the case nest is withdrawn from the forming dies. At this point, the fluid cylinder 176 within the case nest 22 is actuated to cause the eject mechanism 128 to force the completed mirror assemblies from the case nest. As the mirror case locating dies 42 are indexed on table 12 into registry with the ram apparatus as the next cycle of the apparatus continues, the completed mirror assemblies are returned to the operator position 50 for unloading from the table.

DESCRIPTION OF THE PREFERRED METHOD

As will now be apparent from the description of the indexing and assembly apparatus 10, and as outlined in FIG. 19, the preferred method is begun by grasping and holding in an inverted manner at least one of the thermoplastic mirror cases such that the side wall portions extending generally perpendicularly and outwardly from the back wall portion of the case projects downwardly. As mentioned above, the grasping and holding is generally accomplished by grasping and holding the ball pivot support which extends from the rear of the case from a day/night actuator pivotally mounted within the hollow space defined by the extending side wall portions. Preferably, the case is formed from a high impact polypropylene plastic which has a transition temperature range of approximately between 147° C. and 153° C. for producing the best quality cases with this plastic even though the plastic could be heated to a higher heat.

Following the grasping of the mirror case, the case is lowered into the tank 30 containing the heated diethylene glycol such that a predetermined amount of the extending side wall portions 60 of the cases 57 are immersed in the liquid. As shown in FIG. 19A, the amount of the side wall portions heated is somewhat greater than the circumference of the rolled, arcuate lip after it is formed in the forming die. That circumference (shown in FIGS. 16 and 19A) equals approximately 0.285 inches corresponding to a radius of 0.090 inches for the semicircular rolled lip after formation. The amount dipped is greater than the ultimate lip circumference because of normal variances in cases 57 and the heat sink effect of the cases themselves. Preferably, the amount dipped is approximately 0.40 ± 0.05 inches measured at the center of the mirror case for the 12-inch case used as the example herein. If cases with smaller circumference rolled lips are required, the amount of case dipped will be smaller and vice versa. The thickness of the heated portion of the side wall is approximately 0.040 inches in the preferred embodiment.

The diethylene glycol in the tank 30 is maintained at a temperature of between 147° C. – 153° C. with a temperature of 149° C. being preferred. This temperature may vary if the tank design is changed because of currents in the tank. This temperature causes the extending side wall portions 60 dipped in the heated liquid to be softened to their point of plasticity but without becoming molten when the side walls are immersed for a period of approximately 18 to 20 seconds, with 18 seconds being preferred.

After the heating period, the mirror case is raised and withdrawn from the heating liquid at a slow rate of speed allowing the beads of liquid on the case edges to be drawn back into the liquid held in the tank as the withdrawal occurs. As the raising continues, the solenoids 156 are actuated to suddenly jerk the mirror case upwardly a distance of approximately one-half inch thereby shaking the remaining liquid on the edges back into the tank. Removal of liquid in this manner from the edges minimizes the residue remaining on the edges.

Once the cases are raised to a level above that of the indexing table 12, the indexing table is rotated to bring the forming dies into alignment with the cases. The cases are then lowered under the high pressure from the four cylinders 198 in high pressure cylinder 196 to form the rolled arcuate semicircular lip around the vertical edge of the mirror element in the forming die in a manner described above. The range of pressing is between approximately when the lip edge just touches the glass to about 0.03 inches past that touching point. The rate of pressing is between 0.25 and approximately 2 to 2½ inches per second at a pressure of preferably 5,400 pounds of approximately 600–750 per 12-inch mirror case. Preferably, the pressing rate is about 2.0 inches per second. The total forming stroke, therefore, takes approximately 1 to 1½ seconds. The entire transfer time from the immersion in the heating tank to the beginning of the pressing step is maintained at 8 seconds or less, and preferably at 4.5 seconds.

After the pressing operation has been completed, the cases with the rolled loops and the retained mirror elements are held at the 600–750 pound pressure per 12-inch case in the forming dies to cool the formed edges such that the polypropylene regains its rigidity and mechanical strength in its formed condition and stays in contact with the front of the mirror element. The cooling time can be as short as 7.5 seconds with the dies 70 at temperature of about 26.7° C. to 37.8° C. without the use of extra cooling fluid in conduits 114 (FIG. 16). Preferably, the cooling time is about 9.0 seconds without using cooling fluid in conduits 114. Accordingly, the combined period of time for both the pressing and cooling steps in the forming die is between approximately 8½ and 10½ seconds in the preferred method. The cooling time may vary depending on whether cooling liquid such as water is circulated through the forming dies in conduit 114 in the manner described above. After the cooling step, the completed mirror assemblies are withdrawn from the forming die and ejected onto the indexing table by the operation of fluid cylinder 176 as described above.

The pesent method, therefore, provides a highly efficient, reproduceable method for forming mirror case assemblies and especially lightweight, hollow-back type mirror assemblies utilizing thermoplastic mirror cases. Such assemblies reduce the effects of vibration transmitted to the assembly when it is mounted in a vehicle in the normal rearview mirror position.

While one form of the invention has been shown and described, other forms will now be apparent to those skilled in the art. Therefore, it will be understood that the embodiment shown in the drawings and described above is merely for illustrative purposes, and is not intended to limit the scope of the invention as defined by the claims which follow.

The embodiments of the invention in which an exclusive property or privilege is claimed are defined as follows.

1. A method for forming mirror assemblies comprising the steps of:
   (1) grasping and holding a thermoplastic mirror case having side edges extending from a back portion in an inverted manner such that said side edges extend downwardly;
   (2) immersing a portion of said case including a predetermined length of said extending side edges in a heated bath maintained at a predetermined elevated temperature for a predetermined period of time;
   (3) immediately pressing said heated portions of said case into contact with a forming die having a reflective mirror element previously positioned thereon, said forming die having a forming groove, said mirror element prior to and during contact between said heated case portions and the forming die being positioned on said forming die and held in a predetermined position with respect to said forming groove by engaging positioning means with at least a portion of the mirror element which aligns the periphery of the mirror element with the forming groove prior to said pressing of the heated case portions into engagement with said forming die, and thereafter holding the mirror element on said forming die and aligned with the forming groove with holding means separate from said case and said positioning means such that the periphery of said mirror element and a portion of said mirror element spaced inboard from the periphery is left free and extending over said forming groove, and forming said heated portions into a lip extending around the edge of said mirror element with the lip contacting the surface of said mirror element which will be exposed in the finished mirror assembly at a position spaced inboard of the peripheral edge of said mirror element while holding said mirror element with said holding means, said lip being formed by forcing and urging said heated case portions around the peripheral edge of said mirror element and along and in contact with the surface of the forming groove in said forming die and under said peripheral edge and into contact with said mirror element at said inboard position whereby said lip covers the edge of said mirror element and retains said mirror element against support portions within said case; and (4) cooling said formed portions of said case while maintaining said formed portions in their formed configuration and in contact with said mirror element.

2. The method of claim 1 wherein said thermoplastic mirror case is formed from polypropylene; said liquid being maintained at a temperature within the range of about 147° C.-153° C.; said case being immersed in said liquid for a period of between about 15 and 25 seconds; said liquid including diethylene glycol.

3. The method of claim 1 wherein said immersing step includes lowering said case including said extending side edges into said liquid at a first rate of speed and withdrawing said case with said edges at a second slower rate of speed to allow said liquid to be pulled from said edges.

4. The method of claim 1 wherein said case is slowly withdrawn from said liquid and thereafter suddenly jerked away from said liquid to shake off any excess liquid.

5. The method of claim 1 wherein said heated portions of said case are pressed into said forming die within approximately eight seconds or less after removal from said heated liquid.

6. The method of claim 1 wherein the step of pressing said heated portions includes rolling said heated side walls around the peripheral edges of said mirror element in a portion of said forming die having a semi-circular cross-sectional shape such that a portion of said side walls engage the front surface of said element while an integral, internal space is left between said peripheral edges and the remainder of said side walls.

7. The method of claim 6 wherein said cooling step includes holding said rolled, heated portions in said semi-circular portion of said forming die for a predetermined period of time.

8. The method of claim 7 wherein said case is formed from high-impact polypropylene; the combined periods of time for said pressing and cooling steps in said forming die being between about 8.5 and 10.5 seconds.

9. A method for forming mirror assemblies comprising the steps of:
(1) grasping and holding a termoplastic mirror case having side edges extending from a back portion in an inverted manner such that said side edges extend downwardly;
(2) immersing a portion of said case including a predetermined length of said extending side edges in a heated bath maintained at a predetermined elevated temperature for a predetermined period of time to a depth slightly greater than the circumferential dimension of the ultimate lip which will be formed from said heated side edge portions;
(3) immediately pressing said heated portions of said case into contact with a forming die having a reflective mirror element previously positioned thereon, said forming die having a forming groove, said mirror element being positioned on said forming die and held in a predetermined position with respect to said forming groove by engaging positioning means with at least a portion of the mirror element which aligns the periphery of the mirror element with the forming groove prior to said pressing of the heated case portions into engagement with said forming die, and thereafter holding the mirror element on said forming die and aligned with the forming groove with holding means separate from said case and said positioning means such than the periphery of said mirror element and a portion of said mirror element spaced inboard from the periphery is left free and extending over said forming groove, and forming said heated portions into a lip extending around the edge of said mirror element with the lip contacting said mirror element at a position spaced inboard of the peripheral edge of said mirror element, said lip being formed to an ultimate circumferential dimension slightly less than the depth to which said case side edges were immersed in said heated bath by forcing said heated case portions around the peripheral edge of said mirror element along and in contact with the surface of said forming groove and under and into contact with said mirror element while holding said mirror element in position with said holding means whereby said lip covers the edge of said mirror element and retains said mirror element against support portions within said case; and
(4) cooling said formed portions of said case while maintaining said formed portions in their formed configuration and in contact with said mirror element.

10. A method for forming mirror assemblies comprising the steps of:
(1) grasping and holding a thermoplastic mirror case having side edges extending from a back portion in an inverted manner such that said side edges extend downwardly;
(2) immersing a portion of said case including a predetermined length of said extending side edges in a heated bath maintained at a predetermined elevated temperature for a predetermined period of time;
(3) immediately pressing said heated portions of said case into contact with a forming die having a reflective mirror element previously positioned thereon, said forming die having a forming groove, said mirror element prior to and during contact between said heated case portions and the forming die being positioned on said forming die and held in a predetermined position with respect to said forming groove with holding means separate from said case such that said forming groove underlies the periphery of said mirror element and remains in position relative thereto, and forming said heated portions into a lip extending around the edge of said mirror element with the lip contacting said mirror element at a position spaced inboard of the peripheral edge of said mirror element, said lip being formed by forcing said heated case portions around the peripheral edge of said mirror element in said forming groove and under and into contact with said mirror element whereby said lip covers the edge of said mirror element and retains said mirror element against support portions within said case; and
(4) cooling said formed portions of said case while maintaining said formed portions in their formed configuration and in contact with said mirror element;
moving said case to a predetermined position on a movable support prior to said step of grasping and holding said case;
said step of grasping and holding said case including lifting said case from said support and thereafter moving a portion of said support away from said case;

said immersing step including lowering said case including said extending side walls below the level of said support into the heated liquid and thereafter lifting said case from the liquid;

moving said forming die with a mirror element thereon into alignment with said heated case at said predetermined position prior to said pressing step;

said pressing step including lowering said case into contact with said forming die and mirror element; and following said cooling step, lifting said completed mirror assembly from said forming die and thereafter dropping said completed case onto said movable support.

11. A method for forming mirror assemblies comprising the steps of:
(1) grasping and holding a thermoplastic mirror case having side edges extending from a back portion in an inverted manner such that said side edges extend downwardly;
(2) immersing a portion of said case including a predetermined length of said extending side edges in a heated bath maintained at a predetermined elevated temperature for a predetermined period of time;
immediately pressing said heated portions of said case into contact with a forming die having a reflective mirror element previously positioned thereon, said forming die having a forming groove, said mirror element prior to and during contact between said heated case portions and the forming die being positioned on said forming die and held in a predetermined position with respect to said forming groove with holding means separate from said case such that said forming groove underlies the periphery of said mirror element and remains in position relative thereto, and forming said heated portions into a lip extending around the edge of said mirror element with the lip contacting said mirror element at a position spaced inboard of the peripheral edge of said mirror element, said lip being formed by forcing said heated case portions around the peripheral edge of said mirror element in said forming groove and under and into contact with said mirror element whereby said lip covers the edge of said mirror element and retains said mirror element against support portions within said case; and
(4) cooling said formed portions of said case while maintaining said formed portions in their formed configuration and in contact with said mirror element;
sequentially loading a movable support with mirror assembly parts including thermoplastic mirror cases and reflective mirror elements and moving said support to and from a predetermined position prior to said grasping and holding step; removing said cases from said support after said step of grasping and holding said case and performing said steps of immersing, pressing, and cooling said cases at said one position while utilizing tools carried on said support which are sequentially moved into said one position; and returning the formed, completed mirror assemblies to said movable support following said cooling step and thereafter unloading said assemblies from said support.

12. The method of claim 11 including the step of moving said movable support in a closed path; said predetermined position being at one location along said path.

13. A method for forming mirror assemblies comprising the steps of:
(1) positioning a thermoplastic mirror case having side edges extending from a back portion on a movable support and moving said case to a predetermined position with said movable support;
(2) lifting said case at said position from said support with a lifting means at said position such that said case side edges extend downwardly from its back portion;
(3) moving a portion of said support away from said case;
(4) lowering said case with a lowering means at said position through an aperture in said support which has been moved into registry with said case and immersing said extending side edges in a heated bath located below said support at said position and maintained at a predetermined elevated temperature, said side edges being immersed for a predetermined period of time to soften predetermined portions of said side edges by heating to their temperature of plasticity;
(5) lifting said case and side edges at said position from the liquid through said aperture with said lifting means and immediately thereafter lowering said case with said lowering means and pressing said heated, softened portions into contact with a forming die having a reflective mirror element positioned thereon which has been moved by said support into alignment with the heated case and forming said heated portions with a forming groove underlying the peripheral edge of said mirror element into an lip extending over the peripheral edge of said mirror element and into contact with the front surface of said mirror element inboard of said peripheral edge to retain said element in said case;
(6) cooling said formed portions of said case while maintaining them in their formed position in said groove in contact with the mirror element to retain them in contact with the mirror element; and
(7) lifting said completed mirror assembly from said forming die at said position with said lifting means and thereafter placing said completed assembly on said movable support with said lowering means for transportation to another location with said movable support.

14. The method of claim 13 including moving said movable support in a closed path; said predetermined position being at one location along said path; and loading said cases and mirror elements on and unloading said assemblies from said movable support at another location along said closed path.

15. A method for forming mirror assemblies comprising the steps of:
(1) sequentially loading a movable support with mirror assembly parts including thermoplastic mirror cases and reflective mirror elements at a first position, each of said thermoplastic mirror cases including side edges extending outwardly from a back portion;
(2) moving said support to a predetermined second position;
(3) grasping and holding at least one of said thermoplastic mirror cases in an inverted manner with means for grasping, holding, raising and lowering said one case such that its side edges extend downwardly and removing said case from said support by lifting said case with said means;

(4) immersing a portion of said case including its extending side edges in a heated bath maintained at a predetermined elevated temperature for a predetermined period of time by lowering said case with said means through an aperture in said support into said bath positioned below said support at said second position;

(5) withdrawing said case from said heated bath with said means and immediately pressing said heated portions of said case into contact with a forming die having one of said reflective mirror elements previously positioned thereon and forming said heated portions into an arcuate lip extending around the edge of said mirror element with the lip contacting said mirror element in a position spaced inboard of the peripheral edge of said mirror element whereby said lip covers the edge of said mirror element and retains said mirror element in said case;

(6) cooling said formed portions of said case while maintaining said forming die in contact therewith to retain them in their formed configuration and in contact with said mirror element;

(7) returning the formed, completed mirror assemblies to said mirror support;

(8) said steps of grasping, holding, removing, immersing, withdrawing, pressing, and cooling said case to form said assembly being carried out at said second position while utilizing tools carried on said support which are sequentially moved into said second position and used to perform operations on said cases or assemblies, and moved away from said second position; and (9) unloading said assemblies from said support at a position different from said second position.

16. The method of claim 15 including the step of moving said movable support in a closed path; said first and second positions being at two different locations along said path, said other position where said assemblies are unloaded from said support corresponding to said first position.

* * * * *

UNITED STATES PATENT AND TRADEMARK OFFICE
CERTIFICATE OF CORRECTION

PATENT NO. : 4,073,855
DATED : February 14, 1978
INVENTOR(S) : MARC A. KAMERLING ET AL It is certified that error appears in the above–identified patent and that said Letters Patent are hereby corrected as shown below:

Column 1, Line 19:

After "patent" insert --No. 3,918,799--.

Column 1, Line 20:

Please delete "and" (second recitation) -

[In Patent Title].

Column 10, Line 42:

"element" should be --elements--.

Column 12, Line 36:

"lines" should be --line--.

Column 12, Line 53:

"60" should be --50--.

UNITED STATES PATENT AND TRADEMARK OFFICE
CERTIFICATE OF CORRECTION

PATENT NO. : 4,073,855
DATED : February 14, 1978
INVENTOR(S) : MARC A. KAMERLING ET AL It is certified that error appears in the above-identified patent and that said Letters Patent are hereby corrected as shown below:

Column 17, Line 25:

"the" should be --said--.

Column 17, Line 43:

"termoplastic" should be --thermoplastic--.

Column 18, Line 1:

"than" should be --that--.

Column 19, Line 26:

Before "immediately" please insert --(3)--.

Signed and Sealed this

Twelfth Day of September 1978

[SEAL]

Attest:

RUTH C. MASON
Attesting Officer

DONALD W. BANNER
Commissioner of Patents and Trademarks